United States Patent [19]

Araujo et al.

[11] Patent Number: 5,322,819
[45] Date of Patent: Jun. 21, 1994

[54] ULTRAVIOLET ABSORBING GLASSES

[75] Inventors: Roger J. Araujo, Horseheads; David W. Morgan, Corning, both of N.Y.

[73] Assignee: Corning Incorporated, Corning, N.Y.

[21] Appl. No.: 134,003

[22] Filed: Oct. 12, 1993

Related U.S. Application Data

[60] Division of Ser. No. 981,409, Nov. 25, 1992, which is a continuation-in-part of Ser. No. 917,761, Jul. 21, 1992, abandoned.

[51] Int. Cl.$^5$ ................................................. C03C 4/08
[52] U.S. Cl. ......................................... 501/13; 501/65; 501/66; 501/67; 501/69; 501/77; 501/905
[58] Field of Search ................... 501/13, 35, 65, 66, 501/67, 69, 77, 905

[56] References Cited

U.S. PATENT DOCUMENTS

| | | | |
|---|---|---|---|
| 3,325,299 | 6/1967 | Araujo | 106/52 |
| 4,166,745 | 9/1979 | Araujo et al. | 106/47 |
| 4,222,781 | 9/1980 | Morse et al. | 106/47 |
| 5,145,805 | 9/1992 | Tarumi et al. | 501/78 |

FOREIGN PATENT DOCUMENTS 0456351 9/1991 European Pat. Off.

*Primary Examiner*—Mark L. Bell
*Assistant Examiner*—Deborah Jones
*Attorney, Agent, or Firm*—Milton M. Peterson; Clinton S. Janes, Jr.

[57] ABSTRACT

A non-photochromic $R_2O$-$B_2O_3$-$SiO_2$ glass containing a cuprous or cuprous-cadmium halide crystal phase, having a sharp spectral cutoff at about 400 nm, the glass composition consisting essentially of, in cation percent, 35-73% $SiO_2$, 15-45% $B_2O_3$, 0-12% $Al_2O_3$, the $Al_2O_3$ being less than 10% when the $SiO_2$ is over 55%, 0-12% $Li_2O$, 0-20% $Na_2O$, 0-12% $K_2O$, the $Li_2O$+$Na_2O$+$K_2O$ being 4.75-20%, 0-5% CaO+BaO+SrO, 0.125-1.0% $Cu_2O$, 0-1% CdO, 0-5% $ZrO_2$, 0-0.75% $SnO_2$, 0-1% $As_2O_3$ and/or $Sb_2O_3$, the glass containing 0-1.75%. Cl, 0-1.0% Br, 0.25-2.0% Cl+Br and 0-2% F by weight, and having an R-value, calculated in mole percent of 0.15-0.45, the R-value not exceeding 0.30, except as the glass composition meets at least one condition selected from the group: up to 12 cation % $Li_2O$, less than 10 cation % $Al_2O_3$, at least 0.3 cation % $Cu_2O$ and 0.50-2.0% Cl+Br.

Also, a method of making the non-photochromic glass having a sharp spectral cutoff.

8 Claims, 1 Drawing Sheet

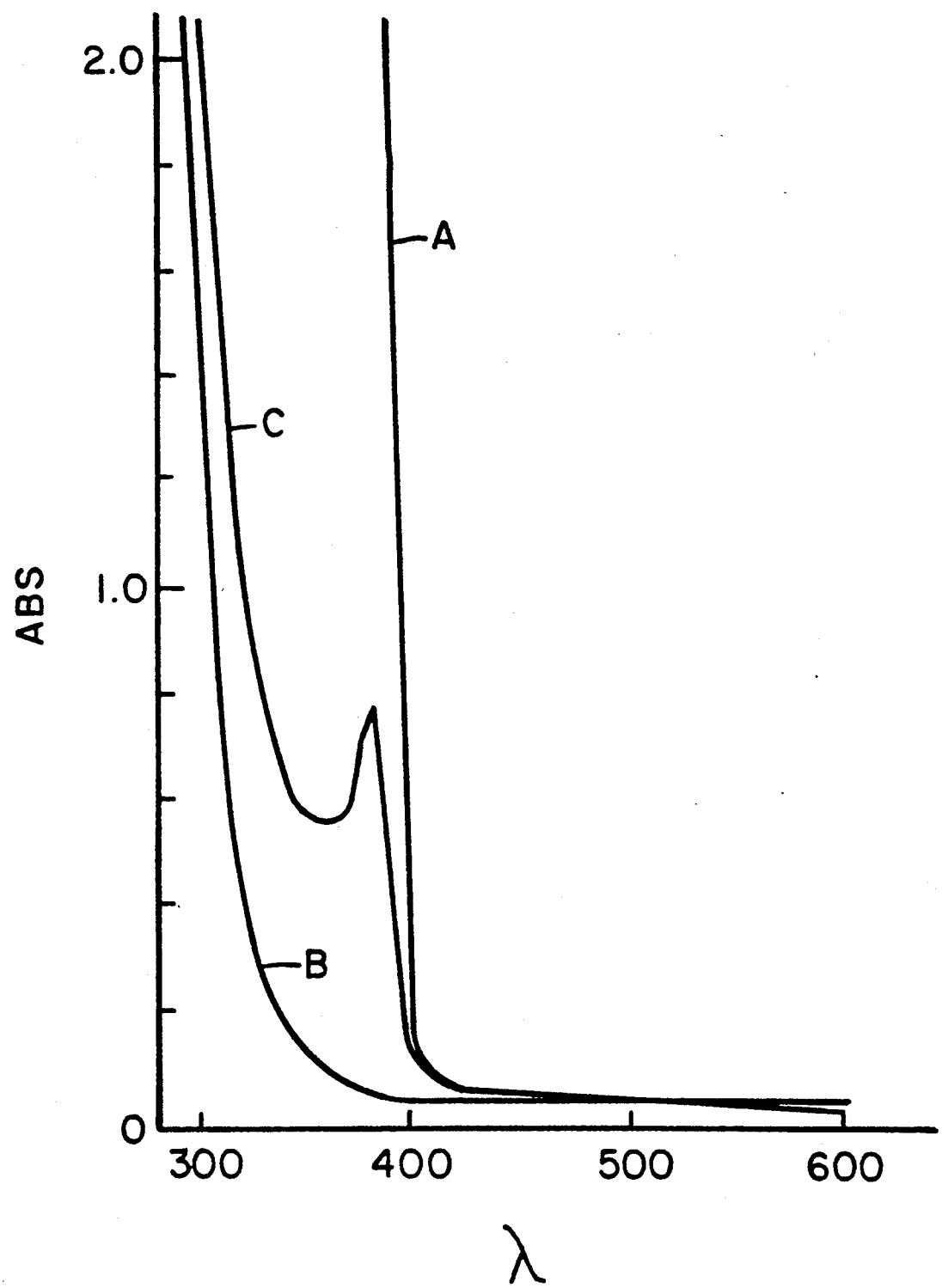

ULTRAVIOLET ABSORBING GLASSES

This is a division of application Ser. No. 07/981,409, filed Nov. 25, 1992, which is a continuation in part of Ser. No. 07/917,761 filed Jul. 21, 1992, now abandoned.

FIELD OF THE INVENTION

The field is a family of glasses that strongly absorb ultraviolet radiation, but are non-photochromic and may be essentially colorless.

BACKGROUND OF THE INVENTION

Recently, a great deal of attention has been directed to the harmful effects of ultraviolet (UV) radiation on humans. Much of the attention has concerned the effect of such radiation on the eye. Accordingly, the value of strong UV absorption by eye glasses has been recognized.

It is well known that UV radiation can also cause degradation and discoloration in such items as paints, fabrics and plastics. Therefore, strong UV absorption by architectural glazing materials is beneficial. The sun is not the only light source that emits UV. Various types of artificial lighting, such as halogen lamps, may also emit W radiation. Accordingly, there is an interest in minimizing UV radiation emitted by artificial sources as well. This may be achieved by utilizing UV absorbing glass in the fabrication of lamp envelopes, reflectors and lenses.

It is common knowledge that photochromic glasses are activated by absorption of UV radiation. The most evident utility of such glasses has been in control of visible light transmission. Inherently, however, they also strongly influence the intensity of UV transmission. This behavior is readily understood in terms of the Grotthus-Draper Law which states that: Only light that is absorbed can produce chemical change.

Photochromic glasses containing silver halide crystals absorb strongly at wavelengths shorter than 320 nm, but only weakly in the interval between 320 and 400 nm. Radiation in the wavelength range of 320–400 nm is much less harmful than that in the shorter wavelength region. Nevertheless, for some purposes, it would be desirable to eliminate transmission of this radiation as well. Therefore, it has been proposed to dope the above glasses with ions which provide additional absorption of UV radiation.

Photochromic glasses containing halides of copper and/or cadmium are also known, but not commercially available. Such glasses were originally disclosed in U.S. Pat. No. 3,325,299 (Araujo). The transmission cutoff in these glasses occurs at approximately 400 nm, and is much sharper than that in silver halide glasses. Consequently, protection against radiation is complete in these glasses without additional doping. We are unaware of any other material that provides such a sharp transmission cutoff at the precise line between visible and UV radiation. The precipitation of the copper halide phase in these glasses is like that of the silver halide phase in the silver halide photochromic glasses. It may require heating of a glass containing in solution the copper and halogen ions of interest. As taught in the patent, the glass is maintained for a short time at a temperature somewhat above the annealing point.

There are numerous applications for glasses having the sharp UV cutoff inherent in the copper or copper-cadmium halide glasses. Frequently, however, such applications require avoiding any change in visible absorption such as occurs in photochromic glasses exposed to UV radiation, e.g., sunlight. Therefore, it would be highly desirable to achieve the sharp UV cutoff characteristic of the copper and copper-cadmium halide glasses without the attendant photochromic behavior. It would also be highly desirable to produce such glasses that are essentially colorless because the yellow color associated with most UV absorbing materials is unacceptable for many applications. However, various fixed colors are desirable for other applications.

It is a basic purpose of the present invention to provide UV absorbing glasses that are not photochromic. A further purpose is to provide glasses that exhibit a sharp cutoff in transmission in the wavelength interval separating visible and UV radiation. Another purpose is to provide a glass in which a desired visible color may be obtained without diminution of the strength of the UV absorption.

SUMMARY OF THE INVENTION

Our invention resides in a non-photochromic $R_2O$-$B_2O_3$-$SiO_2$ glass which contains a precipitated cuprous or cuprous-cadmium halide crystal phase and has a sharp spectral cutoff at about 400 nm, the glass composition consisting essentially of, in cation percent, 35–73% $SiO_2$, 15–45% $B_2O_3$, 0–12% $Al_2O_3$, the $Al_2O_3$ being less than 10% when the $SiO_2$ is over 55%, 0–12% $Li_2O$, 0–20% $Na_2O$, 0–12% $K_2O$, the $Li_2O$+$Na_2O$+$K_2O$ being 4.75–20%, 0–5% CaO+BaO+SrO, 0.125–1.0% $Cu_2O$, 0–1% CdO, 0–5% $ZrO_2$, 0–0.75% $SnO_2$, 0–1% $As_2O_3$, and/or $Sb_2O_3$, the glass containing 0–1.25% Cl, 0–1.0% Br, 0.25–2.0% Cl+Br and 0–2% F by weight, and having an R-value, calculated in mole percent, of about 0.15–0.45, the R-value not exceeding 0.30, except as the glass composition meets at least one condition selected from the group: up to 12 cation % $Li_2O$, less than 10 cation % $Al_2O_3$, at least 0.3 cation % $Cu_2O$ and 0.50–2.0% Cl+Br. Cadmium is not required to secure absorption of ultraviolet radiation. Whereas CdO complements the action of $Cu_2O$, it provides no exceptional benefit which can compensate for the hazards faced in its use due to its extreme toxicity. Moreover, CdO can promote photochromism, which phenomenon is unwanted in the present invention. Therefore, the amount included should be strictly restricted, i.e., not more than 1% and, preferably, not more than 0.5%.

In order to assure that the glass exhibits good chemical durability, $Al_2O_3$ will be included therein in an amount of at least 0.25%. The preferred glass compositions consist essentially, expressed in cation percent, of 40–70% $SiO_2$, the $Al_2O_3$ being less than 10% when the $SiO_2$ is over 55%, 0–12% $Li_2O$, 0–20% $Na_2O$, 0–12% $K_2O$, the $Li_2O$+$Na_2O$+$K_2O$ being 8–20%, 0–5% CaO+BaO+SrO, 0.2–0.5% $Cu_2O$, 0–5% $ZrO_2$ 0–0.5% $SnO_2$, 0–1% $As_2O_3$ and/or $Sb_2O_3$, the glass containing 0–1.0% Cl, 0–1.0% Br, 0.5–1.5% Cl+Br, and 0–2% F by weight, and having an R-value, calculated in mole percent, of 0.15–0.45, the R-value note exceeding 0.30, except as the glass composition meets at least one condition selected from the group: up to 12 cation % $Li_2O$, less than 10 cation % $Al_2O_3$, at least 0.3 cation % $Cu_2O$, and 0.5–1.5% Cl+Br.

PRIOR ART

In addition to the art earlier cited, attention is also directed to the following patent literature:

U.S. Pat. No. 4,166,745 (Araujo et al.) discloses copper-cadmium photochromic glasses that have a refractive index of 1.52–1.54, and that may be strengthened by an exchange of sodium ions for lithium ions.

U.S. Pat. No. 4,222,781 (Morse et al.) discloses photochromic glasses based on copper halide wherein good optical clarity and photochromic properties are provided by controlling the alkali metal oxide, the $Al_2O_3$ and the $B_2O_3$ concentrations in the base glass, and/or by adding $MoO_3$ or $WO_3$ to the composition.

European Publication Number 0 456 351 A2 [U.S. Pat. No., 5,145,805] (Tarumi et al) discloses two glass families containing up to 15% copper halide. The non-phosphate family comprises, in percent by weight, 20–85% $SiO_2$, 2–75% $B_2O_3$, up to 15% $Al_2O_3$, up to 30% alkali metal oxides, up to 10% divalent metal oxides and up to 10% of at least one of $ZrO_2$, $La_2O_3$, $Y_2O_3$, $Ta_2O_3$ and $Gd_2O_3$. The broad ranges of this disclosure fail to disclose critical features of the present invention.

BRIEF DESCRIPTION OF THE DRAWING

The single FIGURE in the attached drawing is a graphical representation comparing the UV Absorption spectra for three glasses.

DESCRIPTION OF THE INVENTION

The present invention is based on our discovery of a family of $R_2O$-$B_2O_3$-$SiO_2$ glasses that contain a cuprous or cuprous-cadmium halide crystal-phase, that are non-photochromic, that are transparent to visible radiation and that have a sharp transmission cutoff between the visible and UV radiation ranges; that is, at about 400 nm. As in the case of the photochromic glasses, the precipitation of the halide crystal phase may require an additional heat treatment after the glass object has been formed. In a preferred embodiment, the glasses are uncolored; that is, they are free of any fixed tint. The invention is further based on the discovery of the composition parameters necessary to produce such glasses.

An initial consideration is precipitation of a cuprous halide crystal phase. This is essential to provide the desired sharp transmission cutoff. For this purpose the glass should contain, in its composition, at least 0,125 cation percent cuprous oxide ($Cu_2O$). The content may range up to about one percent, but cuprous ions tend to disproportionate into cupric ions and neutral atoms at such higher contents. Therefore, we prefer to use no more than about 0.5%.

Absorption in the red part of the spectrum resulting in the development of a blue-green coloration in the glass is associated with the transitions between "d" states in a cuptic ($Cu^{+2}$) ion. The "d" states are completely occupied in a cuprous ($Cu^+$) ion. Therefore, this ion contributes no visible color. Since only the cuprous ion is required for the formation of cuprous halides, colorless glasses with a sharp UV cutoff may be obtained by appropriate adjustment of the oxidation state of the copper.

The oxidation state of the copper observed in glass is influenced by the temperature of the melt, by the partial pressure of oxygen to which the melt is exposed, by the concentrations of polyvalent ions in the glass, and by the basicity (the R-value) of the glass. $As_2O_3$, $Sb_2O_3$ and $SnO_2$ are polyvalent metal oxides which are especially useful because they do not directly impart color to the glass. Nevertheless, care must be used in the choice of reducing agent and the amount used.

Studies have indicated that arsenic is only weakly reducing with respect to the cuprous/cupric oxidation couple, and does not reduce cuprous ions to neutral atoms. However, in the presence of high concentrations of fluorine, arsenic promotes the precipitation of cuptic oxide crystals which impart a strong orange color to the glass. In contrast, tin tends to strongly reduce cuptic ions and can, in high concentrations, reduce the copper all the way to the metal. Colloidal copper metal imparts a red color to the glass. The behavior of antimony oxide is similar to that of tin oxide.

In addition to copper in the cuprous state, at least 0.25% by weight of chlorine or bromine is necessary to combine with the copper to form the required crystal phase. The presence of F may be helpful, but does not produce a cuprous halide phase in the absence of other halogens. The halides are expressed in weight percent, since they obviously do not lend themselves to expression in cation percent. The remainder of the composition components are expressed in cation percent because of the disparity in atomic weights of the cations.

A particularly significant control factor is what has come to be known as the R-value. This value is a measure of basicity of a glass, and is defined by the formula:

$$R = \frac{M_2O + 2MO - Al_2O_3 - ZrO_2}{B_2O_3}$$

where $M_2O$ represents alkali metal oxides and MO represents alkaline earth metal oxides. Precipitation of a cuprous halide crystal phase has been observed in glasses having an R-value below 0.15. However, no particular advantage was seen in such glasses, and they tend to be difficult to melt, or to exhibit poor chemical durability.

In most cases, the R-value should not exceed about 0.35. However, the value may be extended as high as 0.45 by control of other components. These include employing a $Li_2O$ level up to 12 cation percent, maintaining the $Al_2O_3$ level below 10%, employing over 0.3% $Cu_2O$ and/or Cl+Br levels up to 1.5%. In general, however, we find that optimum physical properties, in conjunction with good UV absorption, are observed when the R-value is approximately 0.25. That value may be considered an optimal value.

As mentioned above, the blue-green color associated with the cupric ion absorbing in the red part of the spectrum may be avoided by chemically reducing the copper to the cuprous state. In the circumstance that a green color is desired, it may be obtained by incomplete reduction. Of course, small amounts (up to about 1%) of the transition metal ions or rare earth ions commonly used as colorants in the glass art may be used to impart color without deleterious affects. It has already been mentioned that use of large amounts of arsenic, antimony or tin oxides may produce orange, brown or red glasses. While colorless glasses are preferred in many circumstances, there may be applications in which the colors produced by high levels of reducing agents are desirable.

Any of the materials, such as titania, zirconia, niobia, lead oxide, and the alkaline earth metal oxides, which have been used to raise the refractive index of a glass, can be used in small amounts without serious sacrifice of UV absorption. Many of these materials, such as $TiO_2$, give rise to a moderate to strong yellow or gold color in the presence of copper in those glasses having an R-value conducive to the precipitation of copper chloride. Zirconia and the alkaline earths are especially useful in that they do not contribute to such a yellow color and may be used in amounts up to about 5 cation %. This factor is important because a high value of the refractive index is required for ophthalmic lenses, the usual standard being 1.523. If CaO and/or BaO are employed, it is preferred that they be roughly equal in amount since CaO alone may lead to opacity and BaO alone may inhibit precipitation of the halide phase.

Whereas $MoO_3$ and $WO_3$ can be included to adjust the refractive index of the glasses without a deleterious effect upon the capability of the glasses to absorb ultraviolet radiation, the amounts of those oxides ought to be held at levels below about 0.5 cation percent because they enhance photochromism which the present inventive compositions are designed to suppress.

In glasses which are photochromic because of the presence of copper halides, the UV absorption may be retained and the photochromism suppressed, or totally eliminated, by several simple composition adjustments. A slight diminution of copper will eliminate photochromism without a serious sacrifice of UV absorption. Alternatively, an increase in the concentrations of chloride and bromide, possibly accompanied by a decrease in the concentration of fluoride, eliminates photochromism at ordinary temperatures.

The invention is further described with reference to specific embodiments. TABLE 1A sets forth in cation percent, except for the halogens which are necessarily in weight percent, the compositions of several glasses. These glasses exhibit a sharp UV transmission cutoff that is characteristic of a copper halide crystal phase. Moreover, they are non-photochromic and exhibit no fixed tint. Glasses 5 and 7 illustrate the use of $ZrO_2$ to enhance refractive index while avoiding introduction of a yellow color. The R-values for the glasses are also shown.

TABLE 1B sets forth the same glass compositions as in TABLE 1A, except in weight percent. The base composition (exclusive of halogens, copper and tin oxides) equals or approximates 100 in TABLE 1A. The entire composition approximates 100 in TABLE 1B. The same will be true in TABLES 2A and 2B. CuO was employed as the batch material, the presence of reducing agents in the batch assuring the reduction thereof to $Cu_2O$. $Cu_2O$ comprises about 56% of a concentration of CuO.

TABLE 1A

|  | 1 | 2 | 3 | 4 | 5 | 6 | 7 |
|---|---|---|---|---|---|---|---|
| $SiO_2$ | 42.5 | 42.5 | 49.0 | 49.0 | 46.0 | 65 | 45.5 |
| $Al_2O_3$ | 7.5 | 7.5 | 9.0 | 9.0 | 4.5 | 2.5 | 9.0 |
| $B_2O_3$ | 32.75 | 34.0 | 22.8 | 22.8 | 26.7 | 23.5 | 27.8 |
| $Li_2O$ | 12.0 | 5.25 | 7.0 | 7.0 | 3.5 | — | 6.0 |
| $Na_2O$ | 5.25 | 10.8 | 10.8 | 0.5 | 13.25 | 9.0 | 6.8 |
| $K_2O$ | — | — | 0.75 | 11.0 | 1.5 | — | 3.0 |
| $WO_3$ | — | — | 0.35 | 0.35 | — | — | — |
| $ZrO_2$ | — | — | — | — | 4.5 | — | 2.0 |
| $SnO_2$ | 0.18 | 0.18 | — | — | 0.35 | 0.25 | 0.16 |
| $As_2O_3$ | — | — | 0.35 | 0.35 | — | — | — |
| CuO | 0.25 | 0.25 | 0.30 | 0.30 | 0.50 | 0.28 | 0.25 |
| Cl | 0.60 | 0.60 | 0.40 | 0.40 | 0.60 | 0.75 | 0.50 |
| Br | 0.40 | 0.40 | 0.35 | 0.35 | 0.40 | 0.50 | 0.50 |
| F | — | — | — | — | 1.8 | 0.75 | — |
| R-value | 0.30 | 0.25 | 0.41 | 0.41 | 0.35 | 0.27 | 0.17 |

|  | 8 | 9 | 10 |
|---|---|---|---|
| $SiO_2$ | 37.5 | 70.0 | 71.3 |
| $Al_2O_3$ | 2.5 | 2.0 | 2.1 |
| $B_2O_3$ | 44.2 | 21.2 | 19.8 |
| $Li_2O$ | — | — | — |
| $Na_2O$ | 15.8 | 6.78 | 6.8 |
| $K_2O$ | — | — | — |
| $WO_3$ | — | — | — |
| $ZrO_2$ | — | — | — |
| $SnO_2$ | 0.18 | 0.20 | 0.12 |
| $As_2O_3$ | — | — | — |
| CuO | 0.28 | 0.32 | 0.27 |
| Cl | 0.74 | 0.88 | 0.73 |
| Br | 0.49 | 0.49 | 0.49 |
| F | — | 0.78 | 0.73 |
| R-value | 0.30 | 0.22 | 0.24 |

TABLE 1B

|  | 1 | 2 | 3 | 4 | 5 | 6 | 7 |
|---|---|---|---|---|---|---|---|
| $SiO_2$ | 56.6 | 55.2 | 60.7 | 58.7 | 52.6 | 73.8 | 55.3 |
| $Al_2O_3$ | 8.5 | 8.3 | 9.5 | 9.1 | 4.4 | 2.4 | 9.3 |
| $B_2O_3$ | 25.3 | 25.6 | 16.4 | 15.8 | 17.7 | 15.5 | 19.6 |
| $Li_2O$ | 4.0 | 1.7 | 2.2 | 2.1 | 1.0 | — | 1.8 |
| $Na_2O$ | 3.6 | 7.2 | 6.9 | 0.31 | 7.8 | 5.3 | 4.3 |
| $K_2O$ | — | — | 0.73 | 10.3 | 1.3 | — | 2.9 |
| $WO_3$ | — | — | 1.7 | 1.6 | — | — | — |
| $ZrO_2$ | — | — | — | — | 10.6 | — | 5.0 |
| $SnO_2$ | 0.57 | 0.57 | — | — | 1.0 | 0.71 | 0.49 |
| $As_2O_3$ | — | — | 0.71 | 0.69 | — | — | — |
| CuO | 0.44 | 0.43 | 0.49 | 0.48 | 0.76 | 0.41 | 0.40 |
| Cl | 0.60 | 0.60 | 0.40 | 0.40 | 0.60 | 0.75 | 0.50 |
| Br | 0.40 | 0.40 | 0.35 | 0.35 | 0.40 | 0.50 | 0.50 |
| F | — | — | — | — | 1.8 | 0.75 | — |

|  | 8 | 9 | 10 |
|---|---|---|---|
| $SiO_2$ | 49.9 | 77.5 | 78.8 |
| $Al_2O_3$ | 2.8 | 1.9 | 1.9 |
| $B_2O_3$ | 34.1 | 13.6 | 12.6 |
| $Li_2O$ | — | — | — |
| $Na_2O$ | 10.8 | 3.9 | 3.9 |
| $K_2O$ | — | — | — |
| $WO_3$ | — | — | — |
| $ZrO_2$ | — | — | — |
| $SnO_2$ | 0.58 | 0.55 | 0.35 |
| $As_2O_3$ | — | — | — |
| CuO | 0.48 | 0.48 | 0.40 |
| Cl | 0.74 | 0.88 | 0.73 |
| Br | 0.49 | 0.49 | 0.49 |
| F | — | 0.78 | 0.75 |

TABLE 2A sets forth in cation percent, again except for the halogens, the compositions of several glasses. These glasses also exhibit a sharp UV transmission cutoff characteristic of a copper halide crystal phase and are non-photochromic. However, they do exhibit a fixed tint as indicated. The R-values for these glasses are included in the TABLE.

TABLE 2B sets forth the glass compositions of TABLE 2A in weight percent.

TABLE 2A

|  | 11 | 12 | 13 | 14 | 15 | 16 | 17 |
|---|---|---|---|---|---|---|---|
| $SiO_2$ | 47 | 47 | 46 | 46 | 42.5 | 42.5 | 4 |
| $Al_2O_3$ | 9 | 9 | 9 | 9 | 7.5 | 7.5 | 9 |
| $B_2O_3$ | 30 | 27 | 26.7 | 26.7 | 32.75 | 32.75 | 26.7 |
| $Li_2O$ | — | 5 | 3.5 | 3.5 | — | 8.0 | 3.5 |
| $Na_2O$ | 14 | 7 | 13.3 | 13.3 | 17.25 | 9.25 | 13.3 |
| $K_2O$ | — | 5 | 1.5 | 1.5 | — | — | 1.5 |
| $WO_3$ | 0.35 | 0.35 | — | — | — | — | — |
| $SnO_2$ | 0.10 | 0.10 | 0.3 | 0.17 | 0.18 | 0.18 | 0.20 |
| CuO | 0.25 | 0.25 | 0.5 | 0.5 | 0.25 | 0.25 | 0.50 |
| Cl | 0.60 | 0.60 | 0.25 | 0.25 | 0.60 | 0.60 | — |
| Br | 0.40 | 0.40 | 0.25 | 0.25 | 0.40 | 0.40 | 0.50 |
| F | — | — | 1.85 | 1.85 | — | — | — |
| R-value | 0.17 | 0.30 | 0.35 | 0.35 | 0.30 | 0.30 | 0.35 |
| Color | Yellow | Green | Deep Red | Dark Green | Red | Light Pink | Light Green |

TABLE 2A-continued

|  | 18 | 19 | 20 |
|---|---|---|---|
| $SiO_2$ | 63.1 | 69.2 | 68.3 |
| $Al_2O_3$ | 0.25 | 1.8 | 2.1 |
| $B_2O_3$ | 31.7 | 21.3 | 21.9 |
| $Li_2O$ | 1.5 | — | — |
| $Na_2O$ | 2.0 | 7.6 | 7.8 |
| $K_2O$ | 1.5 | — | — |
| $WO_3$ | — | — | — |
| $SnO_2$ | 0.20 | 0.13 | 0.13 |
| CuO | 0.35 | 0.28 | 0.28 |
| Cl | 0.98 | 0.74 | 0.74 |
| Br | 0.74 | 0.49 | 0.49 |
| F | — | 0.74 | 0.74 |
| R-value | 0.15 | 0.28 | 0.26 |
| Color | Pink | Purple | Pink |

TABLE 2B

|  | 11 | 12 | 13 | 14 | 15 | 16 | 17 |
|---|---|---|---|---|---|---|---|
| $SiO_2$ | 57.3 | 57.4 | 56.5 | 56.8 | 54.3 | 55.8 | 57.8 |
| $Al_2O_3$ | 9.3 | 9.3 | 9.4 | 9.4 | 8.1 | 8.4 | 9.6 |
| $B_2O_3$ | 21.2 | 19.1 | 19.0 | 19.1 | 24.2 | 24.9 | 19.4 |
| $Li_2O$ | — | 1.5 | 1.1 | 1.1 | — | 2.6 | 1.1 |
| $Na_2O$ | 8.8 | 4.4 | 8.5 | 8.5 | 11.4 | 6.3 | 8.6 |
| $K_2O$ | — | 4.8 | 1.5 | 1.5 | — | — | 1.5 |
| $WO_3$ | 1.6 | 1.6 | — | — | — | — | — |
| $SnO_2$ | 0.31 | 0.31 | 0.93 | 0.54 | 0.56 | 0.58 | 0.63 |
| CuO | 0.40 | 0.40 | 0.81 | 0.82 | 0.42 | 0.43 | 0.83 |
| Cl | 0.60 | 0.60 | 0.25 | 0.25 | 0.60 | 0.60 | — |
| Br | 0.40 | 0.40 | 0.25 | 0.25 | 0.40 | 0.40 | 0.50 |
| F | — | — | 1.85 | 1.85 | — | — | — |

|  | 18 | 19 | 20 |
|---|---|---|---|
| $SiO_2$ | 72.8 | 77.3 | 76.6 |
| $Al_2O_3$ | 0.25 | 1.7 | 1.9 |
| $B_2O_3$ | 21.2 | 13.8 | 14.2 |
| $Li_2O$ | 0.4 | — | — |
| $Na_2O$ | 1.2 | 4.4 | 4.5 |
| $K_2O$ | 1.4 | — | — |
| $WO_3$ | — | — | — |
| $SnO_2$ | 0.58 | 0.35 | 0.35 |
| CuO | 0.53 | 0.41 | 0.41 |
| Cl | 0.98 | 0.74 | 0.74 |
| Br | 0.74 | 0.49 | 0.49 |
| F | — | 0.74 | 0.74 |

A comparison of Examples 13 and 14 shows the effect of tin oxide mentioned earlier. Likewise, a comparison of Examples 15 and 16 illustrates the effect of shifting alkali metal oxide contents.

TABLE 3 sets forth compositions of three glasses that are identical in composition, except for CuO content. It also gives the R-value for the compositions, as well as the UV cut off characteristics of the glasses.

TABLE 3

| Oxide | A | B | C |
|---|---|---|---|
| $SiO_2$ | 49.00 | 49.00 | 49.00 |
| $Al_2O_3$ | 9.00 | 9.00 | 9.00 |
| $B_2O_3$ | 22.80 | 22.80 | 22.80 |
| $Li_2O$ | 6.50 | 6.50 | 6.50 |
| $Na_2O$ | 10.40 | 10.40 | 10.40 |
| $K_2O$ | 1.60 | 1.60 | 1.60 |
| $WO_3$ | 0.07 | 0.07 | 0.07 |
| $As_2O_3$ | 0.20 | 0.20 | 0.20 |
| $SnO_2$ | — | — | — |
| CuO | 0.36 | 0.20 | 0.28 |
| Cl | 0.40 | 0.40 | 0.40 |
| Br | 0.40 | 0.40 | 0.40 |
| R-value | 0.42 | 0.42 | 0.42 |
| UV cutoff | Yes | No | Weak |

As indicated, the glass having a CuO content of 0.36% [~0.20% $Cu_2O$] (Glass A) does have a sharp UV transmission cutoff at 400 nm, thus indicating the presence of a copper halide crystal phase. The glass with 0.28% CuO [~0.16% $Cu_2O$] (Glass C) showed weak absorption at wavelengths of 25-400 nm. The glass with a CuO content of 0.20% [~0.11% $Cu_2O$] (Glass B) exhibited essentially no significant absorption of radiation above 325 nm, thus indicating no precipitation of a copper halide phase.

The FIGURE in the attached drawing renders the comparison even more vividly. This FIGURE is a graphical representation wherein wavelength in nm is plotted along the horizontal axis, and degree of absorption (ABS) is plotted along the vertical axis. The three curves are based on absorption measurements made on samples of the three glasses of TABLE 3. The curves are identified by the example numbers in TABLE 3. It will be observed that the curve for glass A, the 0.36% CuO glass, has a sharp transmission cutoff at about 400 nm. Curve C indicates a weak absorption and cutoff, while curve B indicates essentially no absorption above about 325 nm.

TABLE 4 sets forth compositions in cation percent for several glasses having different R-values due to variations in $R_2O$, RO and $B_2O_3$ contents, and the consequent effects on UV cutoff. The TABLE sets forth the R-value, the UV cutoff at 400 nm and the color for each glass.

TABLE 4

|  | D | E | F | G | H | I |
|---|---|---|---|---|---|---|
| $SiO_2$ | 47.00 | 47.00 | 47.00 | 36.90 | 46.00 | 44.10 |
| $Al_2O_3$ | 9.00 | 9.00 | 9.00 | 12.60 | 4.40 | 9.00 |
| $B_2O_3$ | 30.00 | 27.00 | 24.50 | 27.80 | 27.80 | 27.80 |
| $Li_2O$ | — | 5.00 | — | — | 6.00 | — |
| $Na_2O$ | 14.00 | 7.00 | 19.50 | 15.80 | 6.80 | 12.20 |
| $K_2O$ | — | 5.00 | — | — | 3.00 | — |
| CaO | — | — | — | 1.50 | — | 1.50 |
| BaO | — | — | — | 1.50 | — | 1.50 |
| $WO_3$ | 0.35 | 0.35 | 0.35 | — | — | — |
| $ZrO_2$ | — | — | — | 2.50 | 4.60 | 2.50 |
| $SnO_2$ | 0.10 | 0.10 | 0.10 | 0.16 | 0.16 | 0.16 |
| CuO | 0.25 | 0.25 | 0.25 | 0.25 | 0.25 | 0.25 |
| Cl | 0.60 | 0.60 | 0.60 | 0.50 | 0.50 | 0.50 |
| Br | 0.40 | 0.40 | 0.40 | 0.50 | 0.50 | 0.50 |
| R-value | 0.17 | 0.30 | 0.42 | 0.24 | 0.24 | 0.24 |
| UV cutoff | Yes | Yes | No | No | Yes | Yes |
| Color | Yellow | Green | Green | Colorless | Colorless | Colorless |

Glass F of TABLE 4 exhibits no UV cutoff. This indicates the combined effect of lithia being absent and the R-value being high. In contrast, glasses D and E do exhibit strong UV absorption. The distinctions are that glass E has a $Li_2O$ content, while glass D has a low R-value due to a high $B_2O_3$ content and a diminished $Na_2O$ content.

Glass G does not exhibit a UV cutoff, whereas glasses H and I, which have the same R-value, do. Glasses G and I illustrate the importance of maintaining the levels of alumina and silica within the prescribed ranges even for glasses in which the R-value is maintained near an optimal value.

TABLE B sets forth compositions in cation percent for several glasses embodying small composition changes. These glasses illustrate compositional changes that can be made to render a glass non-photochromic.

TABLE 5

|  | J | K | L | M | N | O | P | Q |
|---|---|---|---|---|---|---|---|---|
| $SiO_2$ | 46.00 | 46.00 | 46.00 | 47.00 | 47.00 | 47.00 | 46.00 | 46.00 |
| $Al_2O_3$ | 10.50 | 10.50 | 10.50 | 9.00 | 9.00 | 9.00 | 9.00 | 9.00 |
| $B_2O_3$ | 23.80 | 23.80 | 23.80 | 27.00 | 27.00 | 28.00 | 30.00 | 30.00 |

TABLE 5-continued

| | J | K | L | M | N | O | P | Q |
|---|---|---|---|---|---|---|---|---|
| $Li_2O$ | 6.25 | 6.25 | 6.25 | — | — | — | — | — |
| $Na_2O$ | 11.00 | 11.00 | 11.00 | 17.00 | 17.00 | 16.00 | 14.00 | 7.00 |
| $K_2O$ | 1.50 | 1.50 | 1.50 | — | — | — | — | 7.00 |
| $WO_3$ | — | — | — | 0.35 | 0.35 | — | — | — |
| $As_2O_3$ | 0.50 | 0.50 | 0.50 | — | — | — | — | — |
| $SnO_2$ | — | — | — | 0.20 | 0.12 | 0.12 | 0.10 | 0.10 |
| CuO | 0.50 | 0.50 | 0.35 | 0.25 | 0.25 | 0.25 | 0.20 | 0.20 |
| CdO | — | — | — | — | — | — | 0.75 | 0.75 |
| F | 1.00 | 1.00 | 2.00 | — | — | — | 1.21 | 1.21 |
| Cl | 0.25 | 0.60 | 0.25 | 0.60 | 0.60 | 0.60 | 1.60 | 1.60 |
| Br | 0.25 | 0.40 | 0.25 | 0.40 | 0.40 | 0.40 | — | — |
| R-value | 0.35 | 0.35 | 0.35 | 0.30 | 0.30 | 0.25 | 0.167 | 0.167 |
| Photo-chromic | Yes | No | No | No | Yes | No | Yes | No |

In TABLE 5, glass J is a photochromic glass. It may be rendered non-photochromic by increasing the halogen content, as illustrated by glass K. It may also be rendered non-photochromic by decreasing the $Cu_2O$ level, as illustrated by glass L.

Glass N is also a photochromic glass that may be rendered non-photochromic by minor compositional changes. Glass M illustrates the effect of a small increase in $SnO_2$ content. Care must be taken not to increase the $SnO_2$ content to the point where reduction to copper metal occurs. Glass O illustrates achieving the same end by diminishing the R-value by shifting the $Na_2O$ and $B_2O_3$ contents. Examples M, N, and O are also of interest in illustrating the contribution of $WO_3$ to photochromism. Examples P and Q exhibit UV cutoff and demonstrate that CdO can promote photochromism in certain glass compositions such that its use must be restricted to low values, if present at all.

We claim:

1. A method of inducing a sharp UV transmission cutoff at 400 nm in a $R_2O$-$B_2O_3$-$SiO_2$ glass, said glass consisting essentially of, in cation percent, 35–73% $SiO_2$, 15–45% $B_2O_3$, 0–12% $Al_2O_3$, the $Al_2O_3$ being less the 10% when the $SiO_2$ is over 55%, 0–12% $Li_2O$, 0–20% $Na_2O$, 0–12% $K_2O$, the $Li_2O+Na_2O+K_2O$ being 4.75–20%, 0–5% CaO+BaO+SrO, 0.125–1.0% $Cu_2O$, 0–1% CdO, 0–5% $ZrO_2$, 0–0.75% $SnO_2$, 0–1% $As_2O_3$ and/or $Sb_2O_3$, the glass containing 0–1.75% Cl, 0–1.0% Br, 0.25–2.0% Cl+Br and 0–2% F, the content of Cl, Br, and F in percent by weight of the total content of the glass composition, and having an R-value, calculated in mole percent, of 0.15–0.45, said method comprising altering the glass composition in at least one of the following ways, in an amount effective to induce the sharp UV transmission cutoff at 400 nm:
 a. add up to 12 cation % $Li_2O$;
 b. increase the $Cu_2O$ content to an amount not over 0.5 cation %;
 c. decrease the R-value to a value not less than 0.15.

2. A method in accordance with claim 1 that comprises incorporating $Li_2O$ in the glass composition in an amount effective to induce a sharp UV transmission cutoff at 400 nm, but not in an amount in excess of 12 cation %.

3. A method in accordance with claim 1 which comprises incorporating additional $Cu_2O$ in the glass composition in an amount such that the total $Cu_2O$ content does not exceed 0.5 cation %, that does not render the glass photochromic, but is effective to induce a sharp UV transmission cutoff at 400 nm.

4. A method in accordance with claim 1 that comprises altering the glass composition to adjust the R-value downward to a value effective to induce a sharp UV transmission cutoff at 400 nm, but not to a value less than 0.15.

5. A method in accordance with claim 1 which comprises further altering the glass composition in at least one of the following ways in an amount effective to render the glass non-photochromic:
 a. add an amount of $SnO_2$ up to 0.5 cation percent effective to remove photochromic behavior;
 b. decrease the $Cu_2O$ content to a value below 0.5 cation %, but not below 0.125%;
 c. increase the Cl content above 0.25 % by weight, but not over 1.75%;
 d. decrease the R-value, but not to a value below 0.15.

6. A method in accordance with claim 5 which comprises incorporating $SnO_2$ in the glass composition in an amount effective to render the glass non-photochromic, but not in excess of 0.5 cation %.

7. A method in accordance with claim 5, which comprises incorporating additional Cl or Br in the glass composition to provide a total Cl+Br in an amount effective to render the glass non-photochromic, but not in an amount to provide a total Cl+Br content that is in excess of 1.75% by weight.

8. A method in accordance with claim 5 that comprises altering the glass composition to adjust the R-value downward to a value effective to render the glass non-photochromic, but not to a value less than 0.15.

* * * * *

UNITED STATES PATENT AND TRADEMARK OFFICE
CERTIFICATE OF CORRECTION

PATENT NO. : 5,322,819
DATED : June 21, 1994
INVENTOR(S) : Araujo et al.

It is certified that error appears in the above-identified patent and that said Letters Patent is hereby corrected as shown below:

Column 1, line 26, "W" should be --UV--.

Column 1, line 55, after "against" insert --UV--.

Column 4, line 7, "cuptic" should be --cupric--.

Column 6, line 56, in Example 17, $SiO_2$ should be --46--.

Column 8, line 3, "25" should be --325--.

Signed and Sealed this

Eleventh Day of October, 1994

Attest:

BRUCE LEHMAN

*Attesting Officer*  *Commissioner of Patents and Trademarks*